United States Patent
Abrahamian et al.

(10) Patent No.: US 11,987,654 B2
(45) Date of Patent: *May 21, 2024

(54) POLYMER GLASS TRANSITION TEMPERATURE MANIPULATION VIA Z/E HYDRAZONE PHOTOSWITCHING

(71) Applicant: Trustees of Dartmouth College, Hanover, NH (US)

(72) Inventors: Ivan Abrahamian, Hanover, NH (US); Sirun Yang, Hanover, NH (US); Laura L. Jeliazkov, Hanover, NH (US); Jared D. Harris, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,404

(22) Filed: Dec. 20, 2022

(65) Prior Publication Data

US 2023/0125498 A1    Apr. 27, 2023

Related U.S. Application Data

(63) Continuation of application No. 17/017,222, filed on Sep. 10, 2020, now Pat. No. 11,566,089.

(Continued)

(51) Int. Cl.
*C08F 20/36* (2006.01)
*C08F 8/48* (2006.01)
(Continued)

(52) U.S. Cl.
CPC ............. *C08F 20/36* (2013.01); *C08F 8/48* (2013.01); *C08F 16/28* (2013.01); *C08F 18/22* (2013.01);
(Continued)

(58) Field of Classification Search
CPC .. C08F 8/48; C08F 16/28; C08F 18/22; C08F 20/34; C08F 20/36; C08F 20/60;
(Continued)

(56) References Cited

U.S. PATENT DOCUMENTS 11,566,089 B2 *    1/2023    Abrahamian ......... C08F 220/30

FOREIGN PATENT DOCUMENTS

JP          04284445 A   * 10/1992
JP          2015189808 A * 11/2015

OTHER PUBLICATIONS

Ryabchun, Alexander et al "Shape Persistent Actuators form Hydrazone Photoswitches" Journal of the American Chemical Society 2019, 141, 1196-1200 (Year: 2019).*

(Continued)

*Primary Examiner* — Ling Siu Choi
*Assistant Examiner* — David L Miller
(74) *Attorney, Agent, or Firm* — Shackelford, Bowen, McKinley & Norton, LLP

(57) ABSTRACT

In an embodiment, the present disclosure pertains to a method of changing the glass transition temperature of a polymer. In some embodiments, the polymer includes at least one hydrazone-containing compound. In general, the methods of the present disclosure include one or more of the following steps of: (1) applying light to the polymer; and (2) thereby changing the glass transition temperature of the polymer. In another embodiment, the present disclosure pertains to a polymer having a light-adjustable glass transition temperature. In some embodiments, the polymer includes at least one hydrazone-containing compound.

18 Claims, 3 Drawing Sheets

Related U.S. Application Data

(60) Provisional application No. 62/899,991, filed on Sep. 13, 2019.

(51) Int. Cl.

| | | |
|---|---|---|
| *C08F 16/28* | (2006.01) | |
| *C08F 18/22* | (2006.01) | |
| *C08F 20/34* | (2006.01) | |
| *C08F 22/22* | (2006.01) | |
| *C08F 220/30* | (2006.01) | |
| *C08F 220/34* | (2006.01) | |
| *C08F 220/36* | (2006.01) | |
| *C08F 222/22* | (2006.01) | |
| *C08F 20/60* | (2006.01) | |
| *C08F 120/34* | (2006.01) | |
| *C08F 120/36* | (2006.01) | |
| *C08F 120/60* | (2006.01) | |
| *C08F 122/16* | (2006.01) | |
| *C08F 122/22* | (2006.01) | |
| *C08F 212/14* | (2006.01) | |
| *C08F 218/00* | (2006.01) | |

(52) U.S. Cl.
CPC ............. *C08F 20/34* (2013.01); *C08F 22/22* (2013.01); *C08F 220/30* (2013.01); *C08F 220/34* (2013.01); *C08F 220/36* (2013.01); *C08F 222/22* (2013.01); *C08F 20/60* (2013.01); *C08F 120/34* (2013.01); *C08F 120/36* (2013.01); *C08F 120/60* (2013.01); *C08F 122/16* (2013.01); *C08F 122/22* (2013.01); *C08F 212/26* (2020.02); *C08F 218/22* (2020.02); *C08F 222/225* (2020.02)

(58) Field of Classification Search
CPC ........ C08F 22/22; C08F 26/02; C08F 120/34; C08F 120/36; C08F 120/60; C08F 122/22; C08F 126/06; C08F 212/26; C08F 216/1458; C08F 218/22; C08F 220/30; C08F 220/34; C08F 220/36; C08F 220/365; C08F 220/60; C08F 220/603; C08F 220/606; C08F 222/22; C08F 222/225; C08F 222/226
See application file for complete search history.

(56) References Cited

OTHER PUBLICATIONS

Shao, Baiho et al."Structure Property Analysis of the solution and Solid State properties of Bistabe Photochromic Hydrozones" 2019,Journal of the American Chemical Society 141 8364-8371 (Year: 2019).*

* cited by examiner

POLYMER GLASS TRANSITION TEMPERATURE MANIPULATION VIA Z/E HYDRAZONE PHOTOSWITCHING

CROSS-REFERENCE TO RELATED APPLICATIONS

This application claims priority to U.S. patent application Ser. No. 17/017,222, filed on Sep. 10, 2022, which claims priority to U.S. Provisional Patent Application No. 62/899,991, filed on Sep. 13, 2019. The entirety of each of the aforementioned applications is incorporated herein by reference.

BACKGROUND

Various methods such as, for example, photomelting or photofluidization, can be used to manipulate healability and re-shapeability of polymers. For example, the use of ultraviolet light to induce trans→cis isomerization of polymer-containing azobenzenes has been used to re-shape polymers. However, there are general restrictions of these applications due to limitations of azobenzenes. For instance, azobenzenes have limited substrate penetration depth. Moreover, the thermal instability of the azobenzene cis isomer precludes the locking-in of different glass transition temperature values. Various embodiments of the present disclosure address the aforementioned limitations.

SUMMARY

In an embodiment, the present disclosure pertains to a method of changing the glass transition temperature of a polymer. In some embodiments, the polymer includes at least one hydrazone-containing compound. In general, the methods of the present disclosure include one or more of the following steps of: (1) applying light to the polymer; and (2) changing the glass transition temperature of the polymer.

In another embodiment, the present disclosure pertains to a polymer having a light-adjustable glass transition temperature. In some embodiments, the polymer includes at least one hydrazone-containing compound.

DETAILED DESCRIPTION

Figure 1:
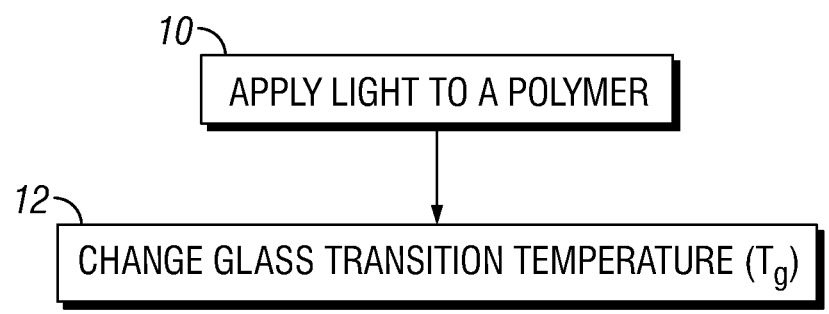
FIG. 1 illustrates a method of changing the glass transition temperature ($T_g$) of a polymer according to an aspect of the present disclosure.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

The temperature at which a polymer transitions from a hard and glassy state into a soft rubbery one is termed the glass transition temperature ($T_g$). This physical property defines the function of a polymer, mechanical properties, how it can be applied, and whether it is re-processable and healable at ambient temperatures.

In most cases, the $T_g$ of a polymer, and hence associated properties, cannot be changed once the polymer is made. However, there are ways to infer healability and re-shapeability on polymers without having ambient $T_g$ values. This can be achieved by exposing polymers to plasticizing solvents or liquefying them by heating above their $T_g$ values.

Alternatively, "photomelting" or "photofluidization" can be used to achieve this goal, though these processes are far less explored and understood. In both cases, light-induced trans/cis isomerization of azobenzene associated with polymers is used to enable "flow" in the polymer by realigning the azobenzene units and/or disrupting intramolecular interactions.

The aforementioned approaches are promising strategies for liquefying polymers as they rely on the high spatial and temporal resolution of light, do not require additional components such as plasticizers to work, and can be used in various potential applications (e.g., photolithography, fabrication of diffraction elements, self-healable devices, and actuators). However, major restrictions to the general application of the aforementioned approaches are limitations associated with the trans/cis isomerization of azobenzene, such as limited substrate penetration depth and limited thermal stability of the cis isomer. Such limitations in turn preclude the locking-in of different $T_g$ values.

In sum, a need exists for more effective compositions and methods for polymer glass transition temperature manipulation. Various embodiments of the present disclosure address the aforementioned need.

In some embodiments, the present disclosure pertains to methods of changing the glass transition temperature ($T_g$) of a polymer that includes at least one hydrazone-containing compound. In some embodiments illustrated in FIG. 1, the methods of the present disclosure include steps of applying light to the polymer (step 10) and thereby changing the glass transition temperature ($T_g$) of the polymer (step 12). In some embodiments, the methods of the present disclosure can be repeated until desired results are achieved (e.g., the hydrazone-containing compounds in the polymer transition from a Z state to an E state, the hydrazone-containing compounds in the polymer transition from an E state to a Z state, or a desired $T_g$ is reached).

In some embodiments, the present disclosure pertains to polymers that have light-adjustable glass transition temperatures ($T_g$). In some embodiments, the polymers include at least one hydrazone-containing compound. Additional embodiments of the present disclosure pertain to methods of making the polymers of the present disclosure.

As set forth in more detail herein, the methods and polymers of the present disclosure can have numerous embodiments. For instance, the methods of changing the $T_g$ of the polymers of the present disclosure can utilize numerous polymers, hydrazone-containing compounds, light sources, light application methods, and mechanisms of changing the $T_g$. The methods of the present disclosure can also have various effects on the polymers of the present disclosure. Various methods may also be utilized to make the polymers of the present disclosure. Additionally, the polymers of the present disclosure may include various hydrazone-containing compounds and $T_g$ values.

Polymers

As set forth in further detail herein, the present disclosure can utilize various types of polymers. In some embodiments, the polymers of the present disclosure generally have a light-adjustable glass transition temperature ($T_g$). In some embodiments, the polymers of the present disclosure include at least one hydrazone-containing compound that can be associated with the polymers in various manners. In some embodiments, the polymers of the present disclosure lack azobenzene units.

In some embodiments, the polymers of the present disclosure can include, without limitation, atactic polymers, syndiotactic polymers, homopolymers, heteropolymers, cyclopolymers, isotactic polymers, and combinations thereof. In some embodiments, the polymers of the present disclosure can include, without limitation, biopolymers, inorganic polymers, organic polymers, conductive polymers, copolymers, fluoropolymers, phenolic resins, polyanhydrides, polyketones, polyesters, polyethers, polyolefins (polyalkenes), rubbers, silicones, silicone rubbers, superabsorbent polymers, synthetic rubbers, vinyl polymers, and combinations thereof.

In some embodiments, the polymers of the present disclosure can include, without limitation, polyesters, polyamides, phenol-methanal plastics, polyurethanes, polycarbonates, and combinations thereof. In some embodiments, the polymers of the present disclosure can include, without limitation, acrylate polymers, methyl acrylate polymers, and combinations thereof.

In some embodiments, the polymers of the present disclosure can include, without limitation, polyethylene, polypropylene, polystyrene, poly(vinyl chloride), polyisobutylene, poly(methyl acrylate), poly(methyl methacrylate), polytetrafluoroethylene, poly(acrylic acid), polyacrylamide, polyacrylonitrile, poly(hydroxyethyl methacrylate), poly(hydroxyethyl acrylate), and combinations thereof.

Hydrazone-Containing Compounds

Hydrazone-containing compounds generally refer to compounds that include at least one hydrazone. The polymers of the present disclosure can include various types of hydrazone-containing compounds. For instance, in some embodiments, the at least one hydrazone in the hydrazone-containing compound is capable of transitioning from a Z state to an E state upon exposure to light. In some embodiments, the at least one hydrazone in the hydrazone-containing compound is capable of transitioning from a Z state to an E state upon exposure to light.

In some embodiments, the hydrazone-containing compounds of the present disclosure have the following chemical configurations:

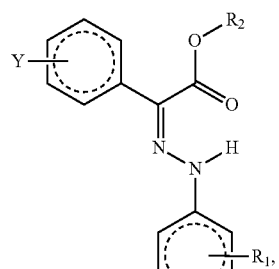

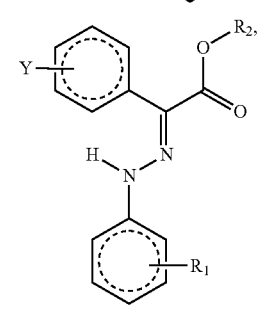

and combinations thereof.

In some embodiments, Y, $R_1$, and $R_2$ can each independently include, without limitation, H, alkyl groups, alkenyl groups, alkoxy groups, aryl groups, ketone groups, amine groups, amide groups, carboxyl groups, carboxylic acid groups, ester groups, thiol groups, sulfoxide groups, alcohol groups, alkyne groups, azide groups, the polymers of the present disclosure, and combinations thereof. In some embodiments, Y, $R_1$ and $R_2$ can each independently include the polymers of the present disclosure.

In some embodiments, Y, $R_1$, and $R_2$ can each independently include, without limitation, $CH_2CH_3$, $C(CH_3)$, $(CH_2)_5 CH_3$, $(CH_2)_7CH_3$, $(CH_2)_9CH_3$, $(CH_2)_{11}CH_3$, $(CH_2)_{1-20}CH_3$, t-butyl, n-hexyl, n-octyl, n-decyl, n-dodecyl,

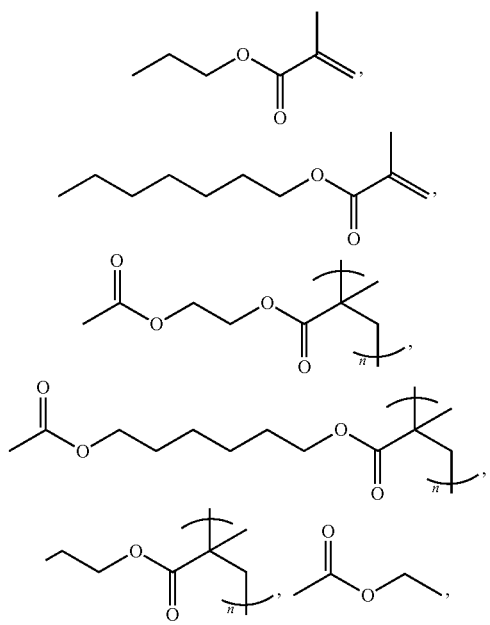

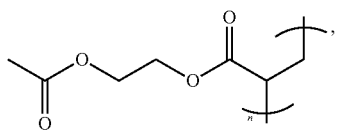
and derivatives thereof. In some embodiments, n is an integer greater than or equal to 1.
In some embodiments, the hydrazone-containing compounds can include, without limitation:
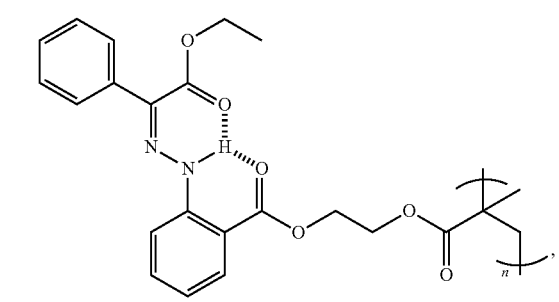
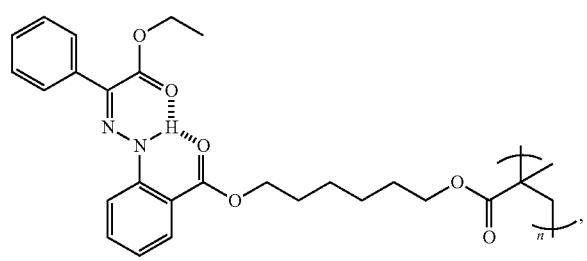
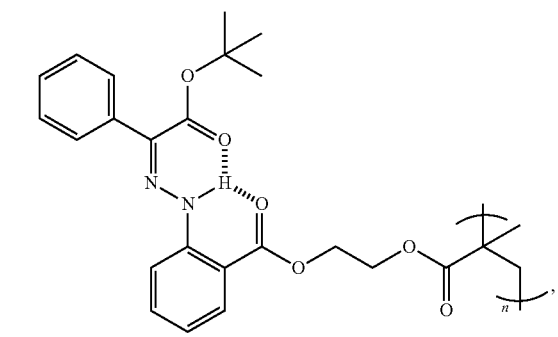
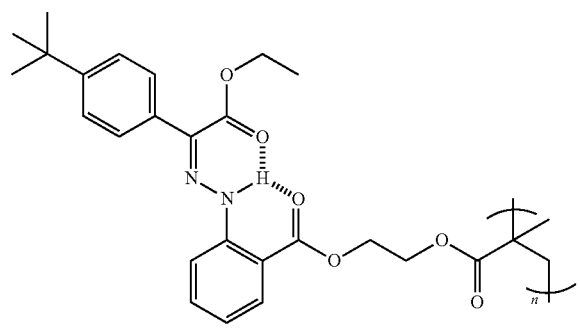
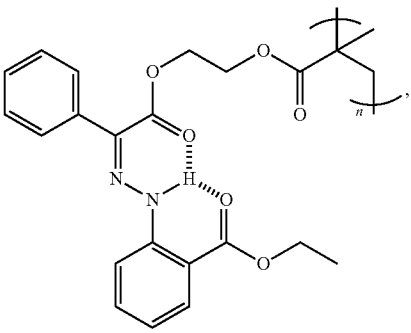
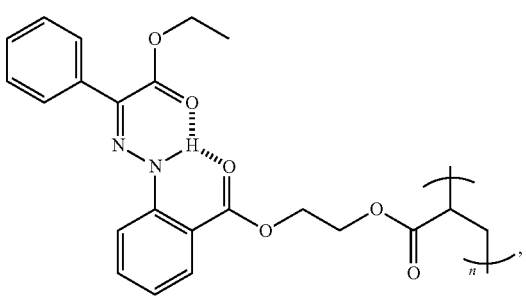
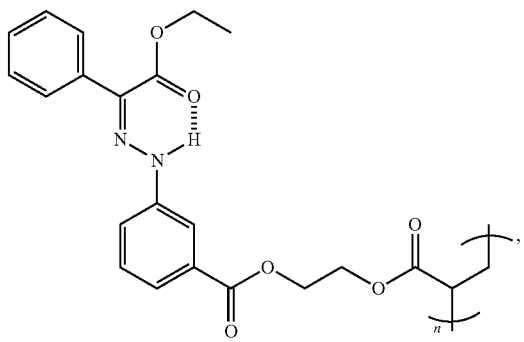
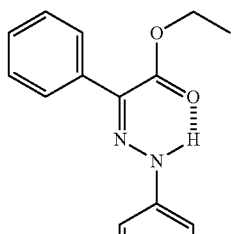
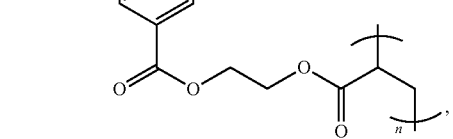

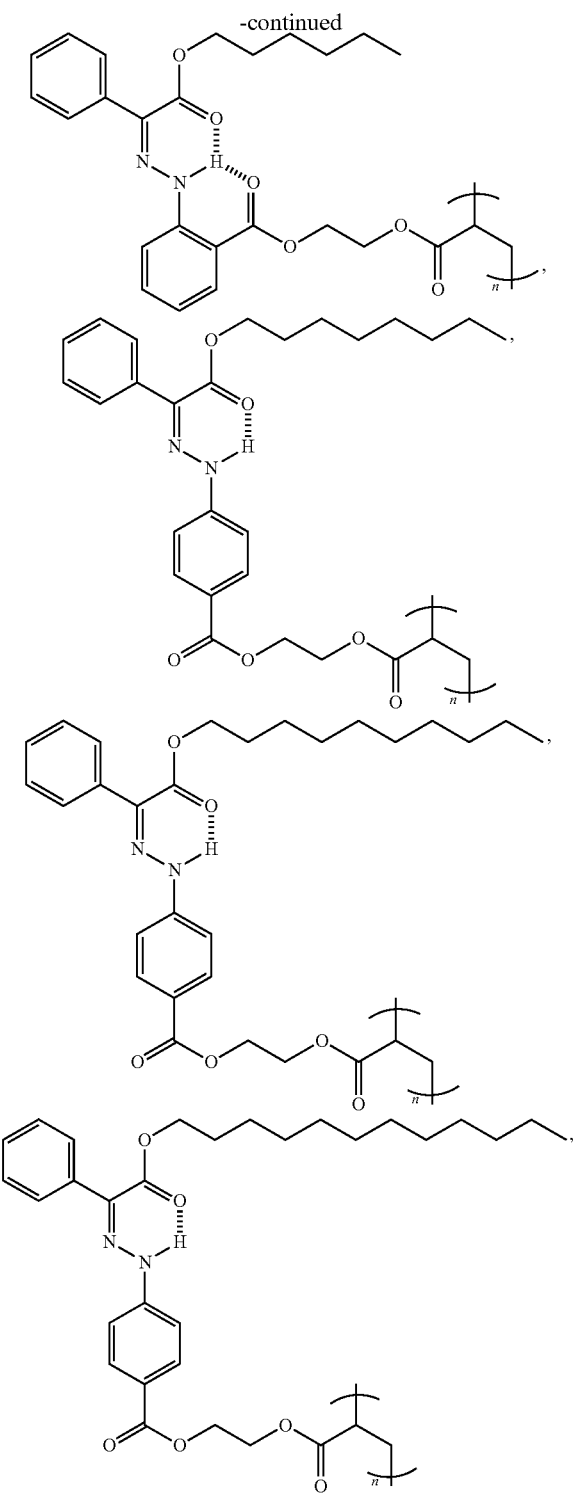

derivatives thereof, and combinations thereof. In some embodiments, n is an integer greater than or equal to 1.

The hydrazone-containing compounds of the present disclosure can be associated with the polymers of the present disclosure in various manners. For instance, in some embodiments, the hydrazone-containing compounds of the present disclosure can be part of a side chain of the polymer. In some embodiments, the hydrazone-containing compounds of the present disclosure are part of monomeric units of the polymers of the present disclosure. In some embodiments, the hydrazone-containing compounds can be covalently embedded within a network of the polymer. In some embodiments, the hydrazone-containing compounds can be non-covalently embedded within a network of the polymer.

Light

Various light sources may be applied to the polymers of the present disclosure. For instance, in some embodiments, the light is derived from a light source. In some embodiments, the light source includes, without limitation, an arc lamp system, short-wave ultraviolet lamps, incandescent lamps, gas-discharge lamps, ultraviolet light emitting diodes, ultraviolet lasers, tunable vacuum ultraviolet systems, natural light, and combinations thereof.

Application of Light

Various methods may be utilized to apply light to the polymers of the present disclosure. For instance, in some embodiments, the application of light can be through irradiation.

In some embodiments, light is applied to the polymers of the present disclosure at various wavelengths. For example, in some embodiments, light is applied at wavelengths ranging from about 300 nm to about 500 nm. In some embodiments, light is applied at a wavelength of about 340 nm. In some embodiments, light is applied at a wavelength of about 365 nm. In some embodiments, light is applied at a wavelength of about 375 nm. In some embodiments, light is applied at a wavelength of about 394 nm. In some embodiments, light is applied at a wavelength of about 410 nm.

Changing of Polymer $T_g$

In some embodiments, the $T_g$ of a polymer can be characterized as the temperature at which the polymer transitions from a hard and non-malleable state into a soft and malleable state. The application of light can have various effects on the $T_g$ of the polymers of the present disclosure.

For instance, in some embodiments, the application of light increases the $T_g$ of the polymers of the present disclosure. In some embodiments, the increase in $T_g$ results in the stiffening of the polymer. In some embodiments, the increase in $T_g$ is more than 5° C. In some embodiments, the increase in $T_g$ is more than 10° C. In some embodiments, the increase in $T_g$ is more than 15° C.

In some embodiments, the application of light decreases the $T_g$ of the polymers of the present disclosure. In some embodiments, the decrease in $T_g$ results in the softening of the polymer. In some embodiments, the decrease in $T_g$ is more than 1° C. In some embodiments, the decrease in $T_g$ is more than 5° C. In some embodiments, the decrease in $T_g$ is more than 10° C. In some embodiments, the decrease in $T_g$ is more than 15° C.

Mechanisms of Changing Polymer $T_g$

Without being bound by theory, the polymers of the present disclosure can have various mechanisms of $T_g$ transition. For instance, in some embodiments, the change in $T_g$ occurs through photo-isomerization. In some embodiments, the hydrazone-containing compounds transition from a Z state to an E state upon photo-isomerization. In some embodiments, the transition from a Z state to an E state is characterized by a decrease in the Z/E isomer ratio.

In some embodiments, the hydrazone-containing compounds transition from an E state to a Z state upon photo-isomerization. In some embodiments, the transition from an E state to a Z state is characterized by an increase in the Z/E isomer ratio.

Effects of Changing $T_g$

The changes of the $T_g$ of the polymers of the present disclosure can result in numerous effects. For instance, in some embodiments, the $T_g$ change is permanent. In some embodiments, the $T_g$ change is controllable as a function of light irradiation time, light wavelength, and combinations thereof. In some embodiments, the $T_g$ change is the result of a change in the Z/E isomer ratio of the hydrazone in the hydrazone-containing compound.

Methods of Making Polymers

Additional embodiments of the present disclosure pertain to methods of making the polymers of the present disclosure. Such methods generally include associating the hydrazone-containing compounds of the present disclosure with the polymers of the present disclosure.

In some embodiments, hydrazone-containing compounds can be associated with polymers by covalently linking the hydrazone-containing compounds with the polymers. In some embodiments, hydrazone-containing compounds can be associated with polymers by non-covalently associating the hydrazone-containing compounds with the polymers.

In some embodiments, the methods of making the polymers of the present disclosure can include polymerization of monomers to the polymers of the present disclosure in the presence of the hydrazone-containing compounds of the present disclosure. In some embodiments, the hydrazone-containing compounds of the present disclosure have a monomer group (e.g., an acrylate group) tethered at various positions in order to facilitate the polymerization and formation of the polymers of the present disclosure.

Applications and Advantages

The present disclosure can have various advantages. For instance, in some embodiments, the methods of the present disclosure can be utilized to manipulate the stiffness of the polymers of the present disclosure at various desired temperatures (e.g., ambient and higher temperatures) through light irradiation.

As such, the methods and polymers of the present disclosure can be utilized in various manners and for various purposes. For instance, in some embodiments, the methods and polymers of the present disclosure can be utilized as healable and reconfigurable polymers for various uses. In some embodiments, such uses can include, without limitation, utilization of the polymers as medical implants, self-healable devices, actuators, or combinations thereof. In some embodiments, such uses can include the utilization of the methods of the present disclosure in photolithography and fabrication of diffraction elements.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Polymer Glass Transition Temperature Manipulation Via Z/E Hydrazone Photoswitching This Example describes polymer glass transition temperature manipulation via Z/E hydrazone photo switching.

The temperature at which a polymer transitions from a hard and glassy state into a soft rubbery one is termed the glass transition temperature ($T_g$). This physical property defines the function of a polymer, mechanical properties, how it can be applied, and whether it is re-processable and healable at ambient temperatures. In most cases, the $T_g$ of a polymer, and hence associated properties, cannot be changed once the polymer is made. There are ways though to infer healability and re-shapeability on polymers, without them necessarily having ambient $T_g$ values. This can be achieved by exposing them to plasticizing solvents or liquefying them by heating them above their $T_g$ values.

Alternatively, "photomelting" or "photofluidization" can be used to achieve this goal. However, such processes are far less explored and understood.

In both cases, light-induced trans/cis isomerization of azobenzene (a light-switch of choice in these applications) is used to enable "flow" in the polymer by realigning the azobenzene units and/or disrupting intramolecular interactions. These are promising strategies for liquefying polymers as they rely on the high spatial and temporal resolution of light, do not require additional components such as plasticizers to work, and can be used in various potential applications (e.g., photolithography, fabrication of diffraction elements, self-healable devices, and actuators, etc.). What restricts the general application of these approaches though are the limitations of the azobenzene. For example, the use of ultraviolet (UV) light (in most cases) to induce trans→cis isomerization limits substrate penetration depth, and the thermal instability of the cis isomer precludes the locking-in of different $T_g$ values.

To address some of these issues, Applicants incorporated recently developed hydrazone photoswitches into polyacrylate and polymethacrylate polymers as side chains, and studied the effect of photoisomerization on the $T_g$s of the polymers. Applicants' hypothesis was that the bistability of these new switches will allow Applicants to lock-in different $T_g$ values for the same polymer as a function of irradiation wavelength, i.e., the isomer Z/E ratio at the photostationary state (PSS). Moreover, Applicants anticipated that the negative photochromic nature of the hydrazone will allow Applicants to overcome the penetration depth issue, which limits the photoreaction in azopolymers to the sample surface.

In this Example, Applicants report on the structure-property analysis of hydrazone-containing polyacrylate and polymethacrylate polymers and show that not only can Applicants lock different $T_g$ values in these systems, but also that the change in $T_g$ values increases upon photoisomerization. This is an opposite trend from what is observed in azopolymers, where an order to disorder transition upon trans→cis isomerization lowers the $T_g$ of the polymer, and which in certain cases induces a solid-to-liquid transition. With hydrazones on the other hand, there is usually an order to (higher) order transition upon Z→E photoisomerization, which can explain why Applicants observe an increase in $T_g$ (i.e., stiffening of the polymers within the window of temperatures between the initial (Z-rich) $T_g$ and final (E-rich) $T_g$).

Example 1.1. Synthesis

Figure 2:
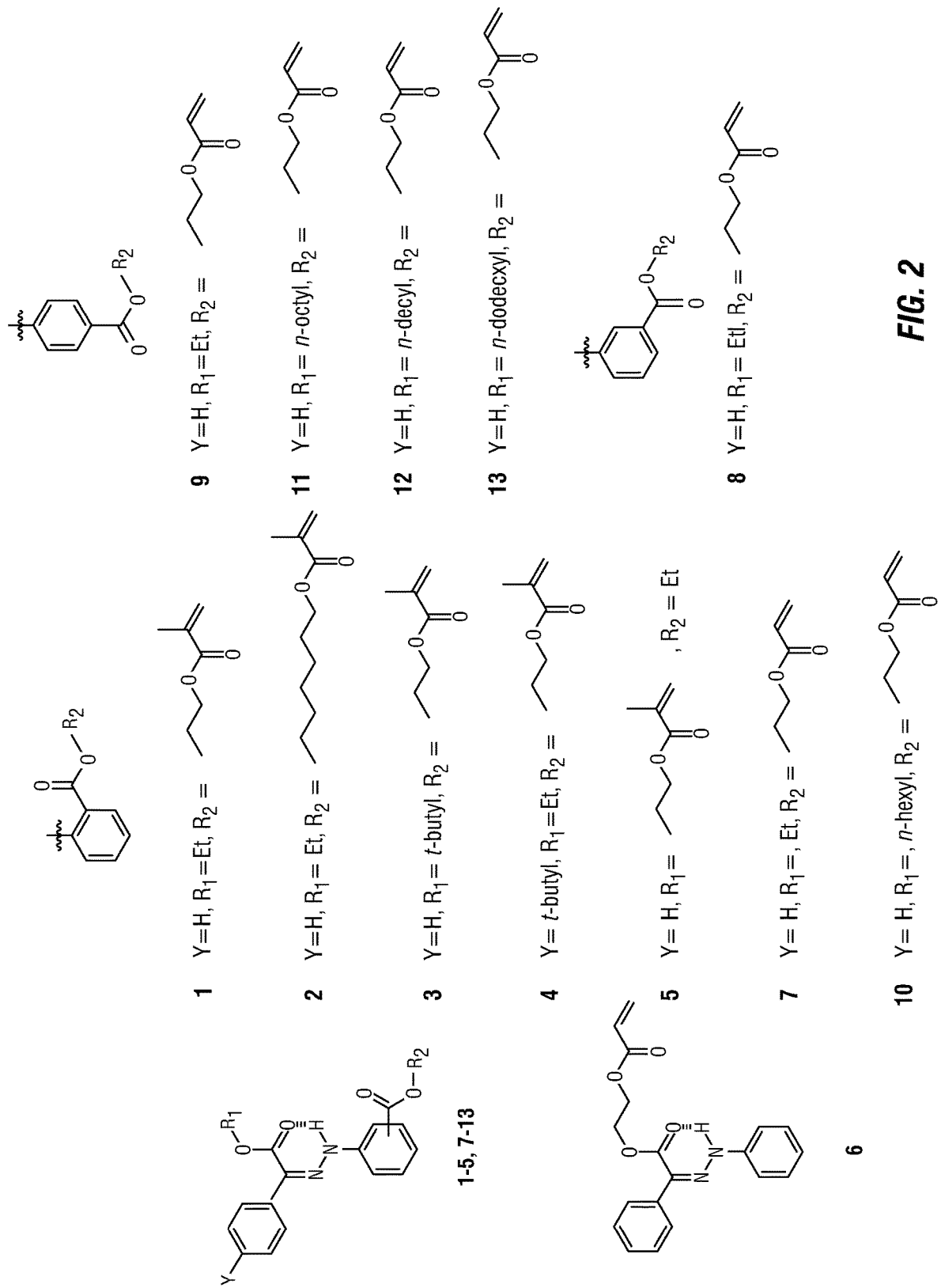
FIG. 2 depicts the generalized structure of a Z-hydrazone monomer, where the acrylate group may be tethered either at $R_1$ or $R_2$ positions, and Y may be either t-butyl or H. The structure of hydrazone 6 is also shown in FIG. 2.

The hydrazone containing monomers 1-13 (FIG. 2), were synthesized in a straightforward manner in relatively high yields (50-99%) and were characterized using nuclear magnetic resonance (NMR) spectroscopy and mass spectrometry. The monomers were then each polymerized using reversible addition-fragmentation chain-transfer (RAFT) conditions with a target degree of polymerization ($X_n$) of 150 in reasonable yields (41-85%). RAFT was chosen to control the polymer molecular weight while simultaneously mitigating dispersity.

Example 1.2. Thermal Analysis

Differential scanning calorimetry (DSC) was used to measure the glass transition temperature of each polymer (Table 1) in both pristine (i.e., >99% Z) and photostationary states (i.e., E enriched at $PSS_{410}$). The $PSS_{410}$ was reached for each material by dissolving it in $CD_2Cl_2$ and irradiating with 410 nm light. Reaching $PSS_{410}$ was confirmed for each product through $^1H$ NMR analysis, which revealed the formation of >94% E for all polymers except for P6 which reaches 80% E at the PSS. Polymer P1, which Applicants will take as a baseline material for the polymethacrylate polymers, displays a pristine $T_g$ of 86° C. and an E-rich $T_g$ of 103° C., resulting in a $\Delta T_g$ of +17° C. (Table 1).

This increase in $T_g$ when switching from the thermodynamically more stable form (Z in this case) to the less stable form (E) is unprecedented in $T_g$ switchable polymers. By lengthening the tether between the hydrazone pendant and the methacrylate backbone, as in P2, Applicants observed a depression of the pristine $T_g$. This is to be expected since the system's rigidity is decreased though the longer tether. Applicants also observed a diminished effect upon $T_g$ when switching from Z to E-rich material (41 and 48° C., respectively) resulting in a $\Delta T_g$ of only +7° C. This result implies that the photoswitch should be proximally close to the backbone to significantly manipulate the $T_g$.

When the ethyl ester in P1 was exchanged for a bulky t-butyl group, the pristine material's $T_g$ increased to 98° C. while the substitution had little effect on $\Delta T_g$ (+16° C.). The addition of the bulky t-butyl group likely introduced more rigidity to the system through intercalation, which ultimately elevated the $T_g$ of both Z and E-rich materials nearly equally. By moving the bulky t-butyl group to the rotor phenyl group in the hydrazone, the $T_g$ of the Z-rich polymer was further elevated to 107° C. However, this had an adverse effect on $\Delta T_g$, which decreased to −1° C. Finally, P5 represents a regiochemically differentiated alternative to P1 where the hydrazone is tethered to the backbone through an ester group ($R_1$). This change had little effect on the pristine polymer's $T_g$ (83° C.), but served to minimize the impact of photoswitching on the $T_g$ of the E-rich material, resulting in a $\Delta T_g$ of only +4° C.

TABLE 1

Summary of the $T_g$s of P1-P13 before and after isomerization.

| | $T_g$ pristine (Z rich) (° C.) | $T_g$ $PSS_{410}$ (E rich) (° C.) | $\Delta T_g$ (° C.) |
|---|---|---|---|
| P1 | 86 | 103 | +17 |
| P2 | 41 | 48 | +7 |
| P3 | 98 | 114 | +16 |
| P4 | 107 | 106 | −1 |
| P5 | 83 | 87 | +4 |
| P6 | 72 | 69 | −3 |
| P7 | 68 | 79 | +11 |
| P8 | 64 | 73 | +9 |
| P9 | 75 | 97 | +22 |
| P10 | 33 | 42 | +9 |
| P11 | 28 | 42 | +14 |
| P12 | 20 | 35 | +15 |
| P13 | 21 | 37 | +16 |

Next, Applicants studied the effect of photoisomerization on the $T_g$ of the polyacrylate polymers P6-P13. Applicants decided to shift to polyacrylate polymers, as in general it has lower $T_g$ values and so Applicants speculated that this property will allow Applicants to induce a controllable rubber-to-glass phototransition, which is in opposite direction to what is observed with azobenzene. Polymer P6, which is made from the simplest hydrazone having the acrylate attached at the ester group position (R1), has the lowest measured pristine and switched $T_g$ so far in the series, as expected from the polyacrylate polymer. The $\Delta T_g$, however, is small and negative, which can be attributed to the lack of the second ester group in the molecule, and hence second H-bond that rigidifies the system. Polymer P7 is the polyacrylate equivalent of P1 and as expected (Table 1) has a lower pristine $T_g$ value, and slightly lower $\Delta T_g$ value (11 vs. 17, respectively). To assess the influence of the position of the polymerizable unit on the $T_g$ Applicants also studied P8 and P9. While the former exhibits slightly lower $T_g$ and $\Delta T_g$ values compared to P7, the latter has a higher pristine $T_g$ value, and intriguingly the largest $\Delta T_g$ in the series (+22° C.). This result indicates that there is better packing in pristine P9 relative to P7, and that the packing upon photoisomerization is the best in the series.

Next, Applicants exchanged the ethyl group in the switch with a hexyl one, to generate free volume that might lower the $T_g$ value further, while maintaining the polymerization group at the para position to maintain the large $\Delta T_g$ value. Applicants' hypothesis proved to be partially correct as the $T_g$ of pristine P10 went down to 33° C., however, the $\Delta T_g$ dropped to +9° C. Applicants assume that the generated free volume lowers the difference in the packing efficiency between the two isomers. Nonetheless, this result is a step closer to a polymeric system having an ambient $T_g$.

Next, Applicants elongated the alkyl chain further to octyl (P11), decyl (P12) and dodecyl (P13) in an effort to further lower the pristine $T_g$ value, and indeed this is what Applicants obtained, with the latter two having ambient $T_g$ values. Moreover, the $\Delta T_g$ value increased slightly from P10 to ~15° C., allowing for a better control over the properties of the polymers. It also seems that Applicants reached the limit of how low the alkyl chain length can push the $T_g$ value, as both P11 and P12 have almost the same value.

Figure 3:
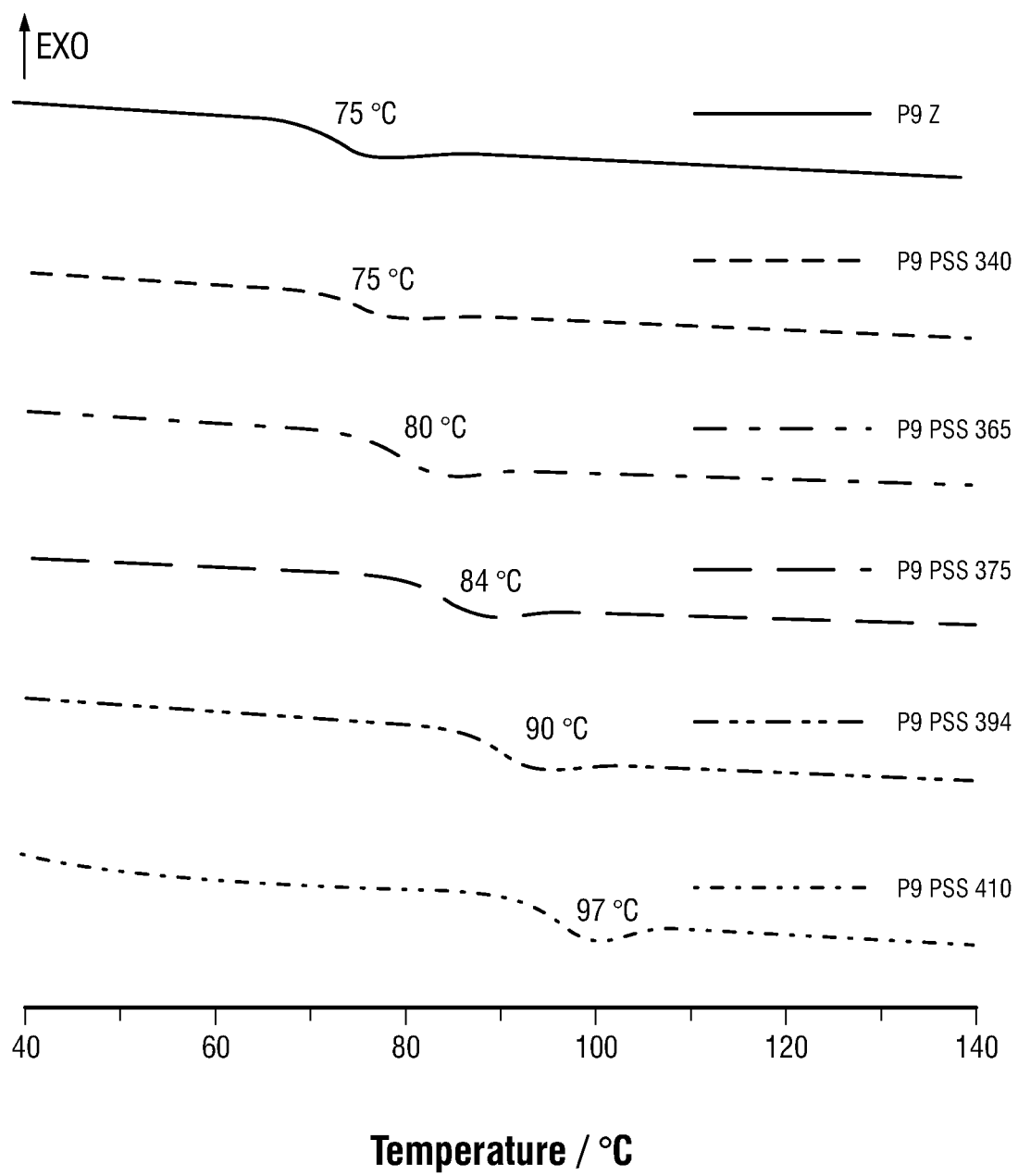
FIG. 3 illustrates differential scanning calorimetry (DSC) curves (second cycles) of different photostationary states (PSSs) of P9 obtained by irradiation at various wavelengths of light.

Next, and as a proof of principle, Applicants used P9 to show that not only can Applicants manipulate the $T_g$ value, but Applicants can also lock it in at different values between 75 and 97° C. as a function of wavelength-dependent PSS (FIG. 3). Applicants first measured the Z/E isomer ratios at different photostationary states obtained after 340, 365, 375, 394 and 410 nm light irradiation, using $^1H$ NMR spectroscopy. Then Applicants used these wavelengths to obtain different $T_g$ values as measured by DSC. It can be seen that 4-7° C. steps can be obtained when enriching the system with the E isomer by moving from $PSS_{365}$ to $PSS_{410}$. Each one of these steps can be locked in place, as evident by the fact that no changes are observed in the DSC curves between the first and second heating cycles. This observation can be attributed to the bistability of the hydrazones (i.e., half-lives in the range of hundreds to thousands of years), which require prolonged heating at high temperatures to initiate the E→Z thermal isomerization. Unfortunately, there is no direct way to quantify the obtained change in $T_g$ as a function of change in E/Z isomer ratio, and therefore it can be envisioned that the higher the E ratio the higher the $T_g$ value.

An exception appears to be when moving from pristine Z and $PSS_{340}$ where the Z ratio goes from >99% to 83%. It seems that not enough E isomer is accumulated at this stage to affect the $T_g$ of the system and so it remains at 75° C.

These results are in general very promising as they indicate that Applicants can manipulate the $T_g$ values of two families of polymers over a broad range, while maintaining large enough $\Delta T_g$ values that are favorable for different types of applications. In most cases the $T_g$ value of the polymers increases after photoirradiation, which is contrary to what is obtained in azopolymers. This unique property is an added benefit to these systems, as it stems from structural changes in the hydrazone and not a random order/disorder transition as observed in the azopolymers. This observation means that the $T_g$ can be further manipulated in the future through structural modifications.

Moreover, Applicants showed that Applicants can use wavelength-dependent PSS to access and lock-in different $T_g$ values for the same polymer. This property is not possible with azopolymers, even with ones that use azobenzene derivatives that have long thermal half-lives, as in most cases the Z isomer is metastable, and quickly reverts to the E form under ambient conditions, and more so upon heating during DSC measurements.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of increasing the glass transition temperature ($T_g$) of a polymer,
wherein the polymer is covalently linked to at least one hydrazone-containing compound,
wherein the hydrazone-containing compound comprises:

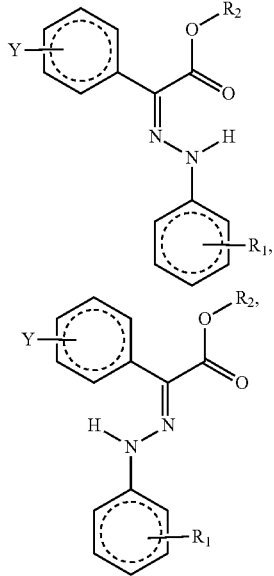

or combinations thereof,
wherein at least one of Y and $R_1$ comprises the polymer,
wherein Y, $R_1$ and $R_2$ are each independently selected from the group consisting of H, alkyl groups, alkenyl groups, alkoxy groups, aryl groups, ketone groups, amine groups, amide groups, carboxyl groups, carboxylic acid groups, ester groups, thiol groups, sulfoxide groups, alcohol groups, alkyne groups, azide groups, $CH_2CH_3$, $C(CH_3)$, $(CH_2)_5CH_3$, $(CH_2)_7CH_3$, $(CH_2)_9CH_3$, $(CH_2)_{11}CH_3$, $(CH_2)_{1-20}CH_3$, t-butyl, n-hexyl, n-octyl, n-decyl, n-dodecyl and combinations thereof, and wherein the method comprises:
applying light to the polymer,
wherein the light increases the glass transition temperature ($T_g$) of the polymer,
wherein the increase in $T_g$ occurs through photoisomerization, and
wherein the hydrazone in the hydrazone-containing compound transitions from a Z state to an E state upon photoisomerization.

2. The method of claim 1, wherein the polymer is selected from the group consisting of polyethylene, polypropylene, polystyrene, poly(vinyl chloride), polyisobutylene, poly(methyl acrylate), poly(methyl methacrylate), polytetrafluoroethylene, poly(acrylic acid), polyacrylamide, polyacrylonitrile, poly(hydroxyethyl methacrylate), poly(hydroxyethyl acrylate), and combinations thereof.

3. The method of claim 1, wherein the hydrazone-containing compound is part of a side chain of the polymer.

4. The method of claim 1, wherein Y comprises the polymer.

5. The method of claim 1, wherein $R_1$ comprises the polymer.

6. The method of claim 1, wherein Y and $R_1$ comprise the polymer.

7. The method of claim 1, wherein Y and $R_1$ are each independently selected from the group consisting of:

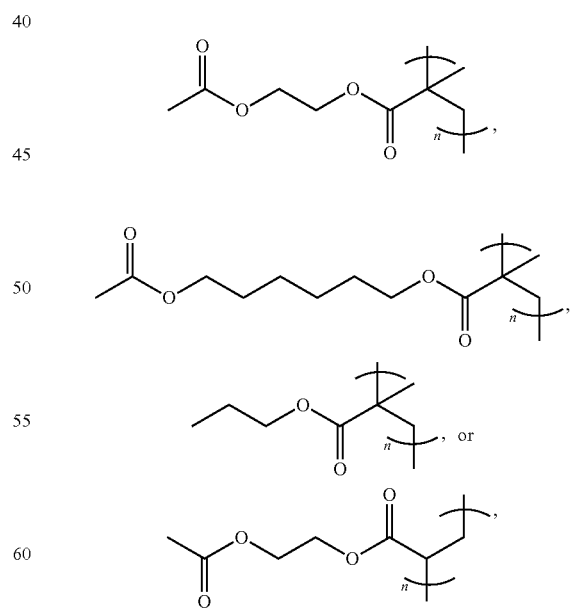

wherein n is an integer of more than 1.

8. The method of claim 1, wherein the hydrazone-containing compound is selected from the group consisting of:

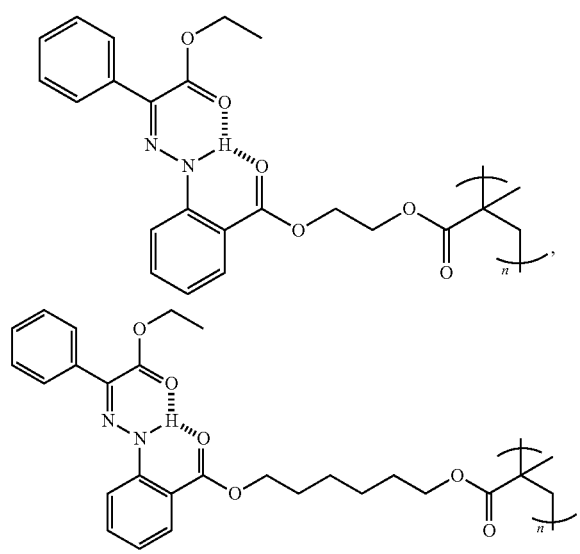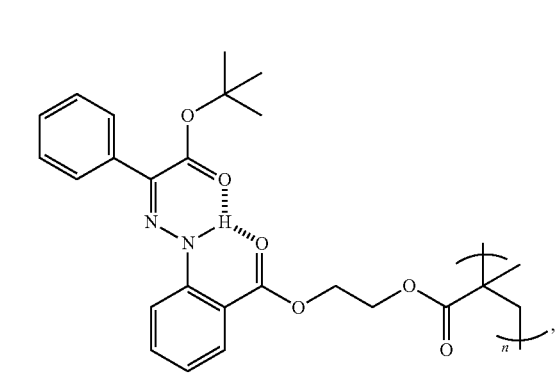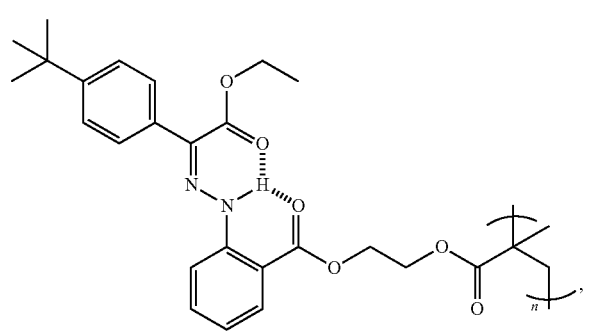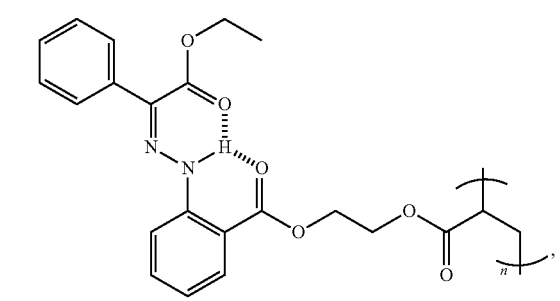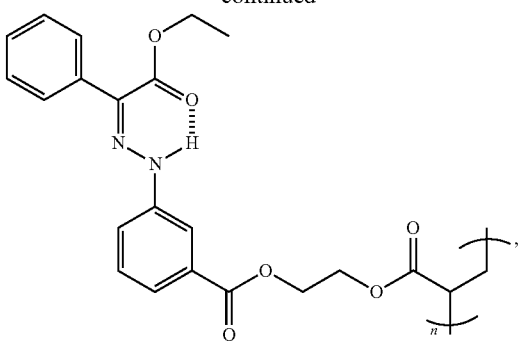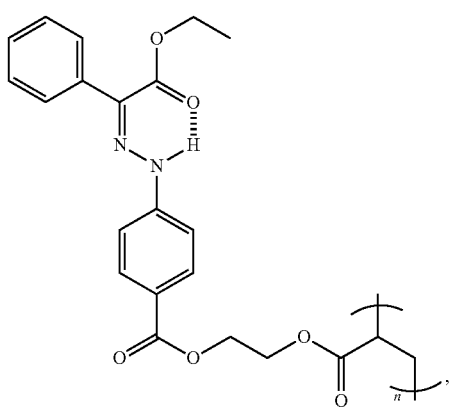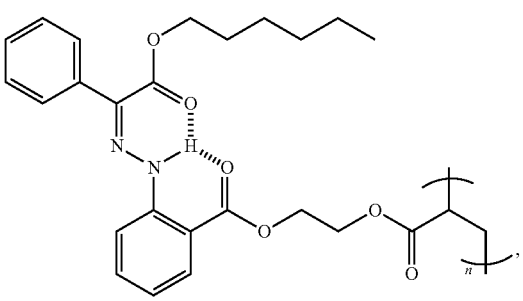

-continued

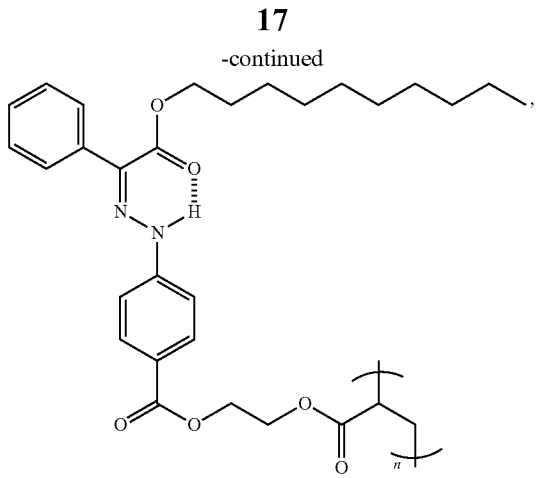

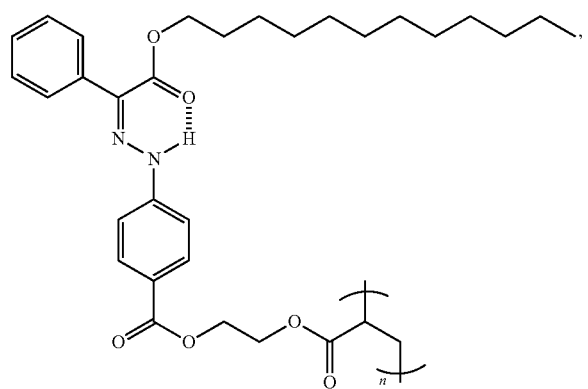

and combinations thereof, wherein n is an integer of more than 1.

9. The method of claim 1, wherein the light is derived from a light source selected from the group consisting of an arc lamp system, short-wave ultraviolet lamps, incandescent lamps, gas-discharge lamps, ultraviolet light emitting diodes, ultraviolet lasers, tunable vacuum ultraviolet systems, natural light, and combinations thereof.

10. The method of claim 1, wherein the increase in $T_g$ results in stiffening of the polymer.

11. A polymer comprising a light-adjustable glass transition temperature ($T_g$), wherein the polymer is covalently linked to at least one hydrazone-containing compound, wherein the hydrazone-containing compound comprises:

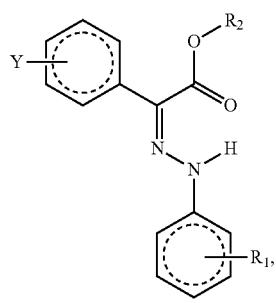

-continued

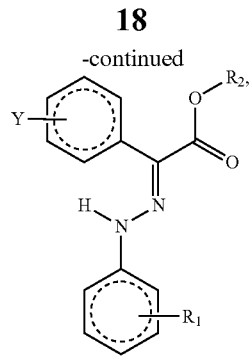

or combinations thereof, wherein at least one of Y and $R_1$ comprises the polymer, wherein Y, $R_1$ and $R_2$ are each independently selected from the group consisting of H, alkyl groups, alkenyl groups, alkoxy groups, aryl groups, ketone groups, amine groups, amide groups, carboxyl groups, carboxylic acid groups, ester groups, thiol groups, sulfoxide groups, alcohol groups, alkyne groups, azide groups, $CH_2CH_3$, $C(CH_3)$, $(CH_2)_5CH_3$, $(CH_2)_7CH_3$, $(CH_2)_9CH_3$, $(CH_2)_{1-20}CH_3$, $(CH_2)_{1-20}CH_3$, t-butyl, n-hexyl, n-octyl, n-decyl, and n-dodecyl and combinations thereof, and wherein the hydrazone in the hydrazone-containing compound is operational to transition from a Z state to an E state upon photoisomerization.

12. The polymer of claim 11, wherein the polymer is selected from the group consisting of polyethylene, polypropylene, polystyrene, poly(vinyl chloride), polyisobutylene, poly(methyl acrylate), poly(methyl methacrylate), polytetrafluoroethylene, poly(acrylic acid), polyacrylamide, polyacrylonitrile, poly(hydroxyethyl methacrylate), poly(hydroxyethyl acrylate), and combinations thereof.

13. The polymer of claim 11, wherein the hydrazone-containing compound is part of a side chain of the polymer.

14. The polymer of claim 11, wherein Y comprises the polymer.

15. The polymer of claim 11, wherein $R_1$ comprises the polymer.

16. The polymer of claim 11, wherein Y and $R_1$ comprise the polymer.

17. The polymer of claim 11, wherein Y and $R_1$ are each independently selected from the group consisting of:

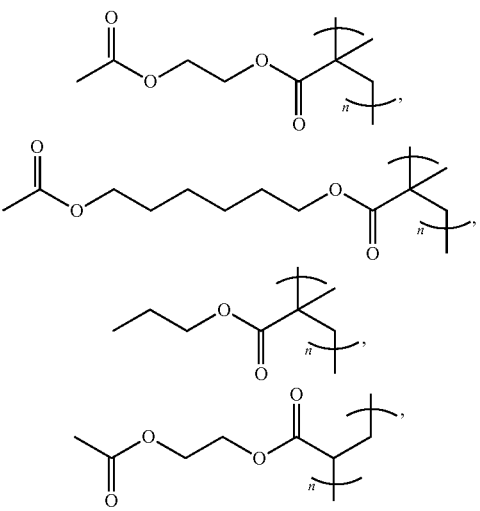

and combinations thereof, wherein n is an integer of more than 1.
18. The polymer of claim 11, wherein the hydrazone-containing compound is selected from the group consisting of:
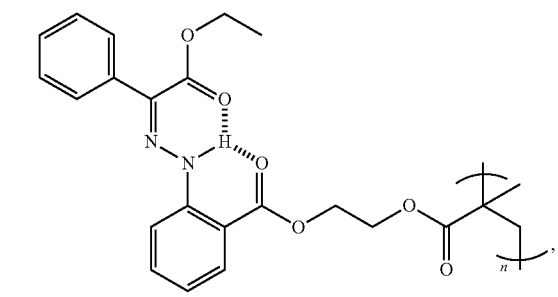
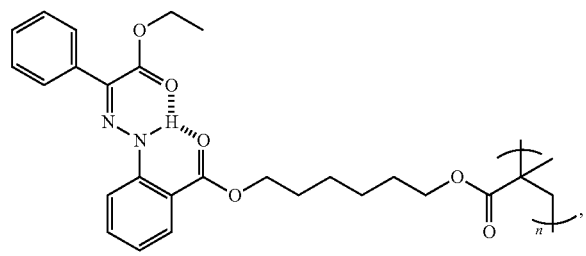
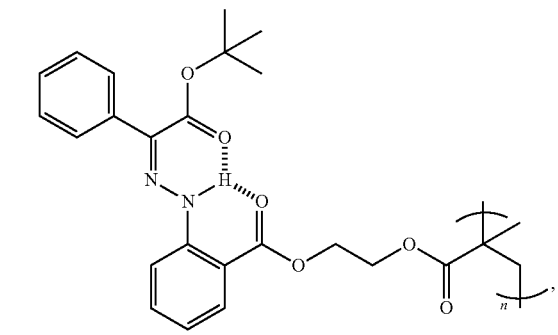
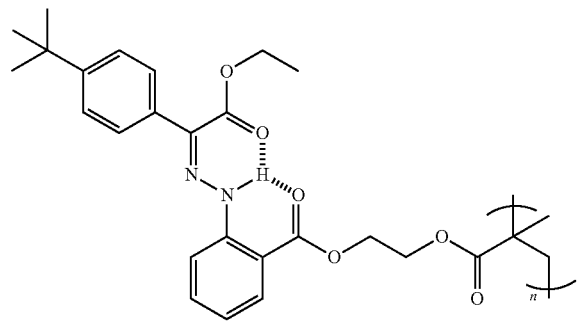
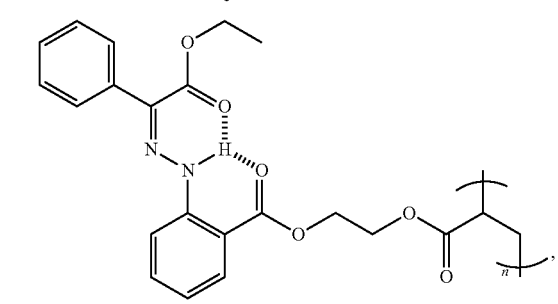
-continued
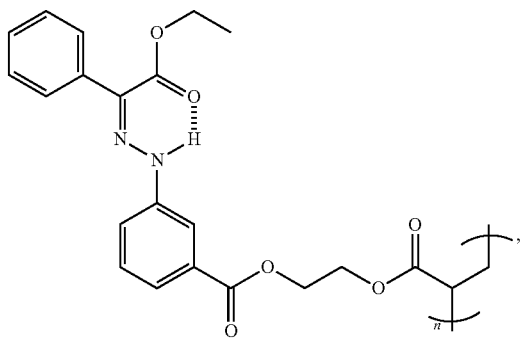
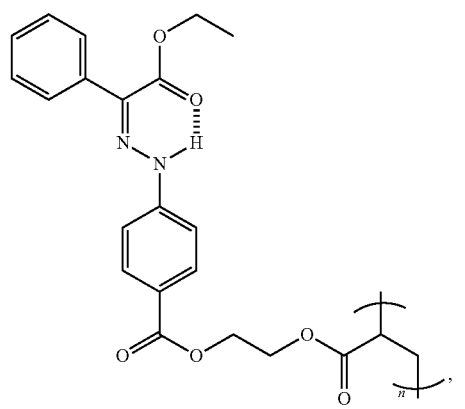
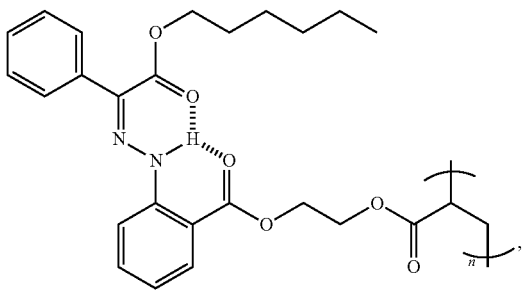
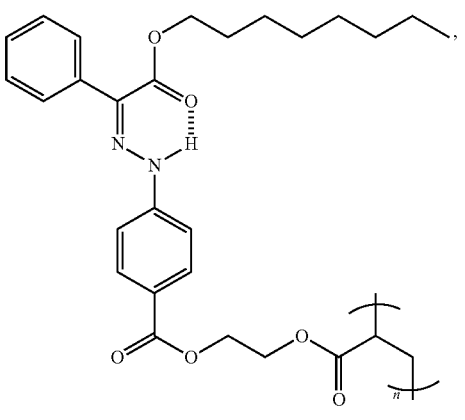

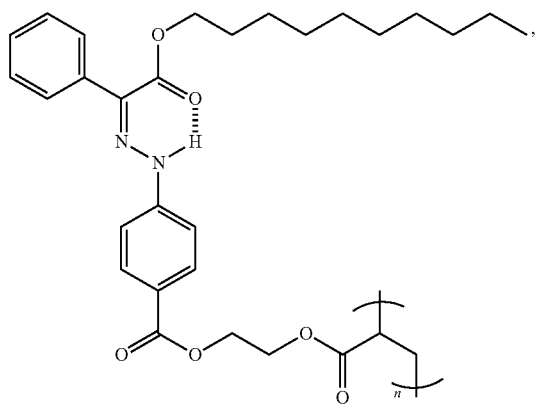
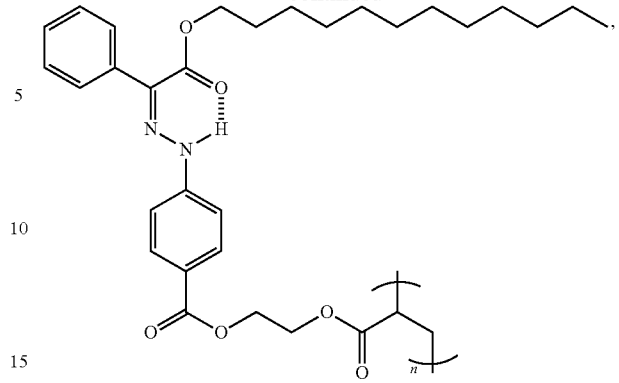
and combinations thereof,
wherein n is an integer of more than 1.
* * * * *